United States Patent [19]

Koike

[11] Patent Number: 5,601,261
[45] Date of Patent: Feb. 11, 1997

[54] BAND CLIP

[75] Inventor: Takashi Koike, Yokohama, Japan

[73] Assignee: Kato Hatsujo Kaisha, Ltd., Kanagawa, Japan

[21] Appl. No.: 508,025

[22] Filed: Jul. 27, 1995

[30] Foreign Application Priority Data

Jul. 29, 1994 [JP] Japan .................................. 6-178842

[51] Int. Cl.⁶ .................................................. F16B 15/00
[52] U.S. Cl. .......................... 248/71; 24/16 PB; 248/743
[58] Field of Search ................ 248/74.3, 71; 24/16 PB, 24/17 AP, 30.5 P

[56] References Cited

U.S. PATENT DOCUMENTS 4,944,475  7/1990  Ono et al. .......................... 248/74.3 X
5,385,321  1/1995  Kume et al. ........................... 248/74.3

*Primary Examiner*—Ramon O. Ramirez
*Attorney, Agent, or Firm*—Armstrong, Westerman, Hattori, McLeland and Naughton

[57] ABSTRACT

In a band clip, comprising a lock portion 10; a band portion 20 elongated from one side of said lock portion 10; and a stem portion 30 formed at the other side of said lock portion 10, for fitting held things W such as wires to a holding member P by winding said band portion 20 around said held things W and inserting the stem portion 30 into a fitting aperture A to be engaged therein with the top of the band portion being inserted into a through hole 11 for engagement, the convenience for handling the band clip, the degree of the freedom in designing of the band portion width and the productivity of the band clip are kept high, and there is no fear for the band clip coming out of a fitting panel.

1 Claim, 2 Drawing Sheets

BAND CLIP

TECHNICAL FIELD

This invention relates to the band clip for holding a cable such as harness (wires) for electrical parts of a car in a fitting aperture on a car body panel.

BACKGROUND OF THE INVENTION

Usually parts formed integrally by synthetic resin, the so-called "band clip (or harness clip or belt clamp)", are used in a car as parts for binding wires or pipes (held things) and fitting them to a holding member of a car body panel to hold them. The band clip comprises a lock portion (a buckle) which has a through hole formed an engaging portion (a step portion or a projection) thereon, a band portion which has a tooth elongated from one side of the lock portion and can be engaged with said engaging portion and a stem portion (a leg) formed on the other side of the lock portion. When the band portion is wound around the held things and the stem portion is inserted into a fitting aperture to be engaged therein in the state that the tooth of band portion and the engaging portion of the lock portion are engaged each other by inserting top of the band portion into the through hole, the held things can be fitted to the holding member of the panel.

A band clip disclosed in Japanese Utility Model Publication No. Showa 58 (1983)-36190, as first example of such prior band clip, is known to those skilled in the art. This band clip is characterize a through hole of its lock portion formed in the inserting direction of a stem portion (in axis direction of a fitting aperture) and insertion of the top of the band portion into the fitting aperture with the stem portion. As second example, a band clip disclosed in Japanese Utility Model Publication No. Heisei 5 (1993)-43344 is known to those skilled in the art. This band clip is characterize its through hole formed in the direction transversely to the inserting direction of a stem portion and the top of the band portion wound round held things being drew from the side of a lock portion along the upper surface of a panel in the state that the held things are fitted to the panel.

In the first example of the band clip disclosed in Japanese Utility Model Publication No. Showa 58 (1983)-36190, the top of the band portion is easily deformable and is inserted into the fitting aperture; therefore the top is not rarely caught by the fringe of the fitting aperture and cannot be smoothly inserted into the fitting aperture with the stem portion. Since the width of the band portion of this type of the band clip is limited by the bore of the fitting aperture, modification of the band portion for improving its holding capacity cannot be done freely. Furthermore, in this type of the band portion, rapping direction of the band portion (the direction of band portion's thickness) and rapping direction of the through hole of the lock portion (in the axis direction of the through hole) at moulding are different and so a mould for moulding them is required to be slidable; therefore the productivity of this type of the band portion is not high.

On the other hand, in the second example of the band clip disclosed in Japanese Utility Model Publication No. Heisei 5 (1993)-43344, since the top of the band portion is not inserted into the fitting aperture and the top of the band portion is in the surface side of the panel when held things are fitted to the holding member of the panel, the rapping direction of the band portion and that of the through hole of the lock portion is in the same direction; therefore the second example has not a fault such as above-mentioned one. But in this type of the band clip, whole lock portion is positioned above the fitting surface of the holding member formed a fitting aperture and so the space between the fitting surface of the holding member and the upper surface of the lock portion, namely, the space between held things and the fitting surface of the holding member, when the held things are fitted to the holding member, is larger than that of the first type of the band clip. More in concretely, in this second type the band clip, the size of the through hole having the engaging portion for engaging band portion passed through the through hole is added to the thickness of the lock portion. For example, if the thickness of the band portion is about 1.5 mm, the thickness of the lock portion of the first type of the band clip is about 3 mm, on the other hand, the thickness of the lock portion of the second type of the band clip reaches a thickness of 6.5 mm.

The band clip that the space between the fitting surface of the holding member such as a panel and held things such as wires is large is extremely adverse for using in a field requiring highly compacted parts arrangement. For example a recent car is equipped with a lot of electrical equipment such as phonographic equipment or navigation equipment and is also equipped with safety equipment such as air bag system. The car is required to have large inside space and so it is extremely important in designing car to save a little space such as back side space of instrument panel or door trim or under space of a carpet.

Since both in the first type of the band clip and the second one the stem portion is flexible in the radius direction and is pressed to the inner surface of the fitting aperture, the lock portion and the stem portion are largely deformed in said radius direction when the held things such as wires or the lock portion is pressed by external force in the radius direction, and so it is not rarely that said pressed stem portion is loosed to come out of the fitting aperture and drop therefrom.

Accordingly it is an object of the invention to provide a band clip which is convenient to handle and whose degree of the freedom in band portion width designing and productivity are high, furthermore whose lock portion height is low and whose stem portion never drops from a fitting aperture.

DISCLOSURE OF THE INVENTION

The present invention is intended to achieve above-mentioned object.

According to the present invention, there is provided, in a band clip, comprising a lock portion (10); a band portion (20) elongated from one side of said lock portion (10); and a stem portion (30) formed at the other side of said lock portion (10), for fitting held things (W) such as wires to a holding member (P) by winding said band portion (20) around said held things (W) and inserting the stem portion (30) into a fitting aperture (A) to be engaged therein with the top of the band portion being inserted into a through hole (11) for engagement, said through hole (11) is formed transversely to the inserting direction of the stem portion (30) for the top of said band portion (20) to be drew in the surface side of the holding member (P) in the fitting state, said lock portion (10) is formed with a convex portion (15) in the other side possible to fit into said fitting aperture (A), and said lock portion (10) is shaped to be partially accommodated in said fitting aperture (A) in the fitting state.

According to this invention, since said through hole (11) of the lock portion (10) is formed transversely to the inserting direction of the stem portion (30) and the top of said band portion (20) is drew in the surface side of the held things (W) when it is in the fitting state, the top of said band portion (20) never prevents the stem portion (30) from being inserted into the fitting aperture for fitting and the width of said band portion (20) is not limited by the diameter of the fitting aperture; furthermore, the rapping direction of the band portion (20) elongated from the lock portion (10) to the opposite side of the stem portion (30) coincides with the direction of the through hole (11) of the lock portion (10).

Since said lock portion (70) has a convex portion (15), in the other side, which is possible to fit into said fitting aperture (A) of the holding member (P) and said lock portion (10) is shaped to be partially accommodated in said fitting aperture (A) in the fitting state, the height of the lock portion (10) from the fitting surface of the holding member can be lowered by an amount being partially accommodated in said fitting aperture (A), and then contact of the convex portion (15) with the inside of the fitting aperture (A) prevents the lock portion (10) from large shifting in the radius direction of said through hole (11).

BEST MODE FOR CARRYING OUT THE INVENTION

Referring now to the accompanying drawings, an embodiment of this invention will be described.

Figure 1:
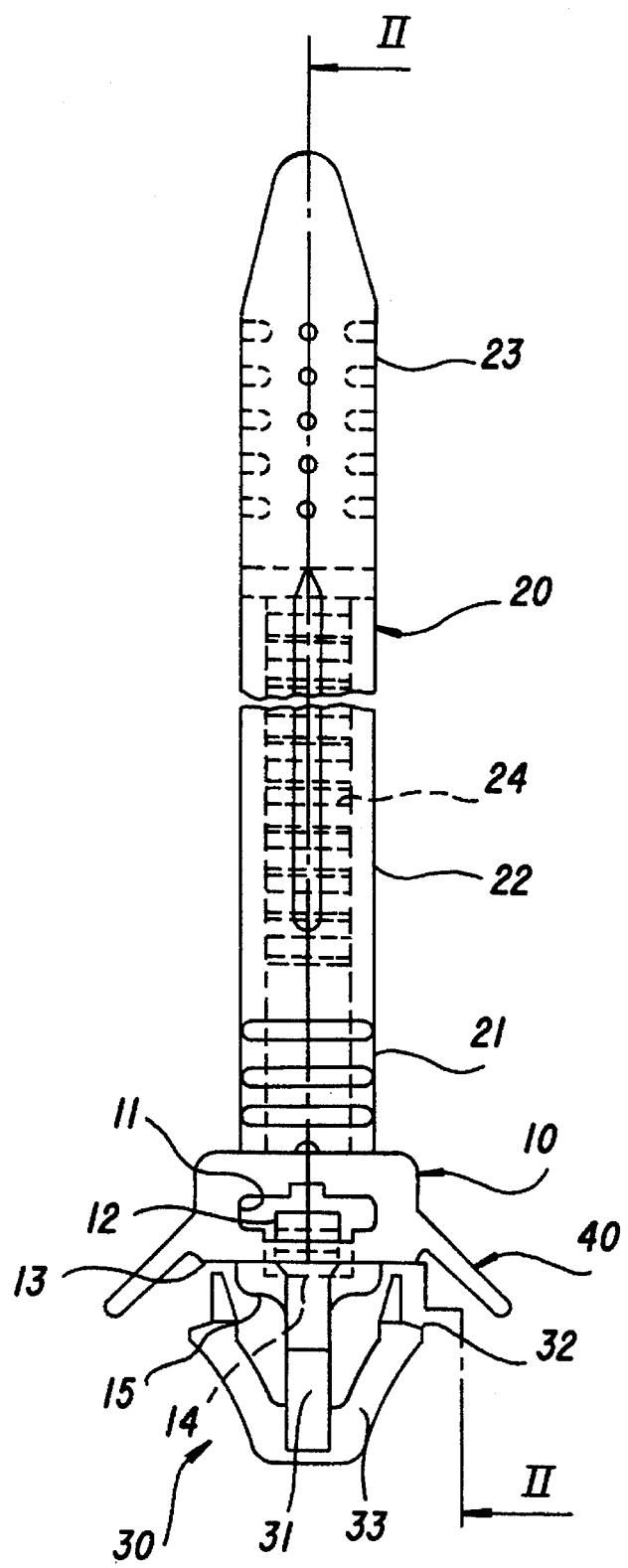
FIG. 1 is an elevational view of a band clip embodying the invention.
Figure 2:
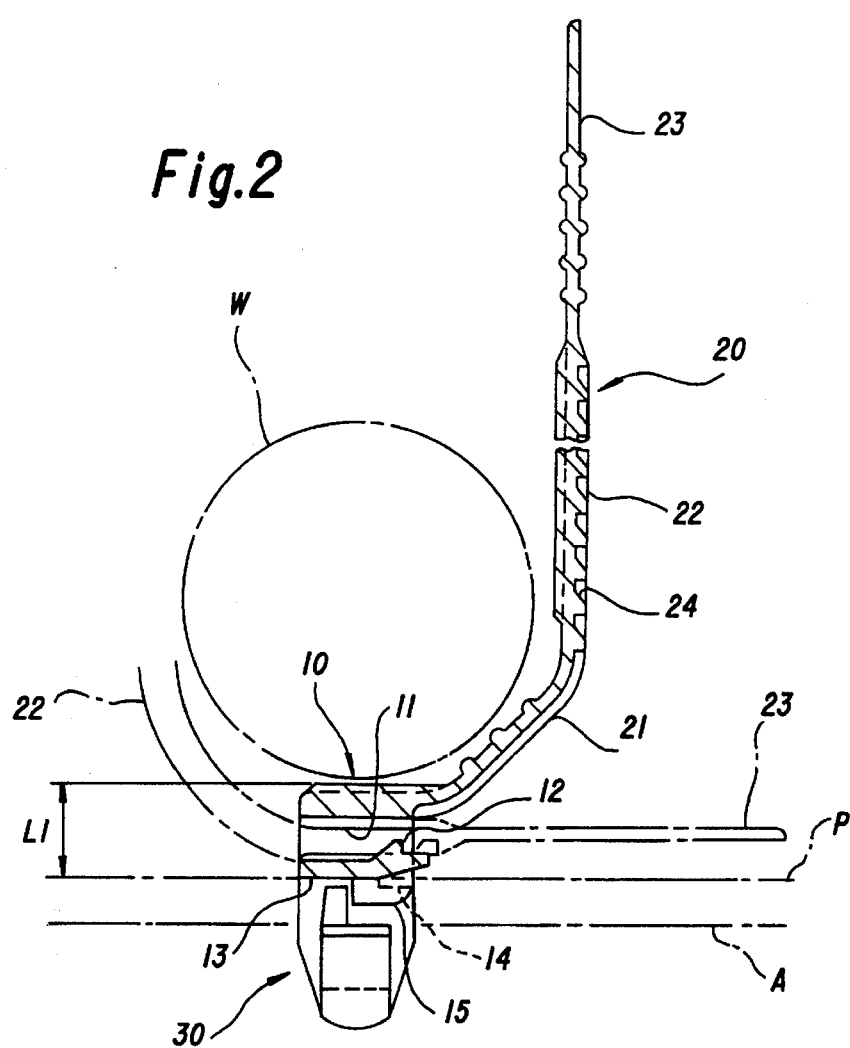
FIG. 2 is a sectional view taken substantially along the line II—II of FIG. 1.
Figure 3:
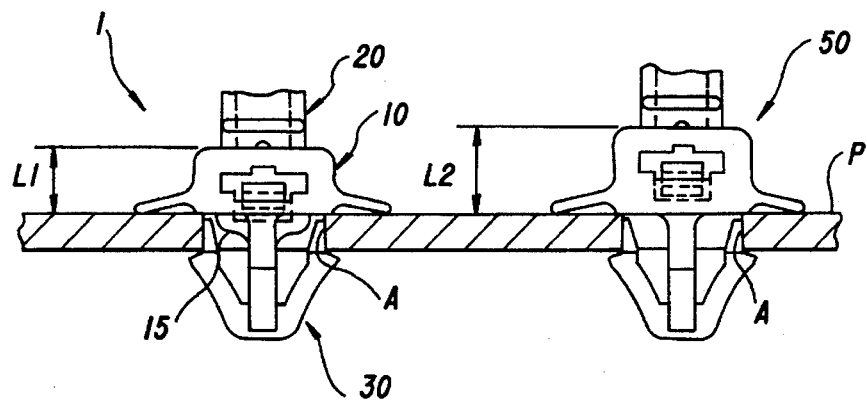
FIG. 3 is a view of a band clip, embodying the invention in a fitting state, comparing with a conventional band clip.

As shown in FIGS. 1 and 2, a band clip 1 embodying this invention has a lock portion 10, a band portion 20, a stem portion 30 and wing portions 40. An external form of the lock portion 10 is rectangular, and the lock portion has a through hole 11 penetrating transversely. A flexible projection 12 is formed on lower inside of the through hole 11. In a fitting state, as shown in FIG. 3, an under surface 13 of the lock portion 10 and a fitting panel (holding member) P are joined together. A concave portion 14 formed the projection 12 is formed below said under surface 13, and the thickness of the part projects from the under surface 13 and it forms a convex portion 15 which engages with a fitting aperture A of the fitting panel P. Thus the height L1 of the lock portion 10 from the under surface 73 is lowered by an amount of the lock portion 10 being partially accommodated in said fitting aperture A. Concretely when the thickness of the band portion is about 1.5 mm, the height L1 can be about 5 mm. The flexible projection 12 is shaped so as to pass over teeth 24 at the inserting of the band portion 20 and to operate like a ratchet to permit the insertion of the band portion 20 alone.

The band portion 20 is a flexible thin band. A base end portion 21 of the lock portion 10 is elongated from an upper side of the lock portion 10 obliquely. The band portion 20 bends halfway and its inserting portion 22 and its top portion 23 elongate upward. At least the top portion 23 and the inserting portion 22 are shaped to be possible to insert into said through hole 11, and teeth 24 are formed at regular distance on one side of said flexible projection 12.

The stem portion 30 comprises a supporting portion 31 elongated downward from under surface of the lock portion 10 and a flexible piece 33 which elongates obliquely upward from both sides of low end of the supporting portion 31 like an anchor and is formed ridges 32 at its top ends. When the stem portion 30 is inserted into said fitting aperture A of the fitting panel P, the flexible piece 33 bends temporarily, and then as shown in FIG. 3 said ridges 32 are caught by corner portions of said fitting aperture A and are locked there.

The wing portions 40 are thin plate elongated obliquely upward from both lower sides of the lock portion 10. When the band clip is fitted to the fitting panel P, the wing portions 40 contact elastically the upper surface (fitting surface) of the fitting panel P and apply force to the fitting panel P in the direction pulling up the stem 30; therefore the band clip can be fitted to the fitting panel P without shaking irrespective of its thickness.

The operation of the embodiment will be explained next.

According to the above-mentioned band clip 1, said held things W are easily fitted and held to the fitting panel P by steps: winding the band portion 20 around said held things W such as wires; engaging said flexible projection 12 and teeth 24 by inserting the top portion 23 of the band portion 20 into said through hole 11 of the lock portion 10 as shown in FIG. 2 with a chain line; and locking the stem 30 by inserting it into said fitting aperture A of the fitting panel P. In this fitting state, the top portion 23 of the band portion 20 is in the upper side of the fitting panel P, and the space between the fitting panel P and the held things W equals L1, that is, the height of the lock portion 70. When an outside diameter of the held things W is small and so the top portion 23 of the band portion 20 in the upper side of the fitting panel P is long, the top portion of the band portion 20 may be cut before inserting the stem portion 30 into said fitting aperture A.

Since said through hole 11 of the lock portion 10 is formed transversely to the inserting direction of the stem portion 30 (the longitudinal direction in FIG. 1) and the top portion 23 of said band portion 20 is drew in the upper surface side of the fitting aperture A when it is in the fitting state, the top portion 23 of said band portion 20 never prevents the stem portion 30 from being inserted into the fitting aperture A for fitting and the width of said band portion 20 is not limited by the diameter of the fitting aperture A; furthermore, the rapping directions of the band portion 20 and the through hole 11 of the lock portion 70 coincide with each other (the transverse direction in FIG. 2). Accordingly it is possible to improve, for example, the efficiency of car assembling operation by improving fitting work, the degree of the freedom in band portion width designing and productivity. If the material of the band clip is changed from PA (polyaramide) resin to the cheap material such as PP (polypropylene) resin, the rigidity of the material degrades, however, enough holding capacity can be obtained by widening the width of the band portion 20; thus, the production cost of the band clip can be decreased by reducing the material cost and improving the productivity with a simplified forming die.

Furthermore underside of said lock portion 10 of the above-mentioned band clip is formed with a convex portion 15 possible to fit into said fitting aperture A, and said hock portion 10 is shaped to be partially accommodated in said fitting aperture A in the fitting state; therefore the height L1 of the lock portion 10 from the fitting surface can be lowered by an amount of lock portion being partially accommodated in said fitting aperture A. Although in said conventional second type of the band clip 50 (whole lock portion is in the upper side of the fitting panel P), as shown in FIG. 3, the height L2 of the lock portion is so high, the height L1 of the lock portion 10 is lowered by an amount of the convex portion 15 being accommodated in said fitting aperture A. Thus the distance between the upper surface of the fitting panel P and the held things W can be shorter than the distance of the conventional, therefore an arrangement space for the held things W can be reduced, that is, for example, it can be more easy to enlarge the inside of a car or more free to arrange harness i designing a car. Since the contact of the convex portion 15 with the inside of the fitting aperture A prevents the lock portion 10 from large shifting in the radius direction of said through hole the band clip 1 cannot be come out of the fitting panel P by transverse slipping.

Industrial Applicability

According to the band clip of this invention, although the through hole 11 of a lock portion is formed transversely to the inserting direction of a stem portion and the top portion of a band portion is drew in the upper surface side of held things when it is in the fitting state, the lock portion is shaped to be partially accommodated in the fitting aperture in the fitting state and so the height of the lock portion from the fitting surface can be lowered by an amount of lock portion being partially accommodated in said fitting aperture. Therefore the band clip is convenient to handle and whose degree of the freedom in designing of the band portion width and whose productivity are kept high, furthermore the space for fitting held things can be reduced, and there is no fear for the band clip coming out of a fitting panel.

I claim:

1. A band clip, comprising:

a lock portion having a first side and a second side;

a band portion elongated from said first side for winding at least wires thereon; and a stem portion formed at said second side for inserting said stem portion into a fitting aperture formed in a holding member to be engaged therein, wherein said lock portion has a through hole for drawing said band portion therein with said wires wound by said band portion, said through hole being formed transversely to an inserting direction of said stem portion, and wherein said lock portion is formed with a convex portion in said second side such that said convex portion fits into said fitting aperture, whereby said lock portion is partially accommodated in the fitting aperture.

* * * * *